(12) United States Patent
Zhang et al.

(10) Patent No.: US 8,379,757 B1
(45) Date of Patent: Feb. 19, 2013

(54) NARROW-BAND OFDM MODE FOR WLAN

(75) Inventors: Hongyuan Zhang, Fremont, CA (US);
Sudhir Srinivasa, Sunnyvale, CA (US);
Rohit U. Nabar, Sunnyvale, CA (US);
Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 338 days.

(21) Appl. No.: 12/789,325

(22) Filed: May 27, 2010

Related U.S. Application Data

(60) Provisional application No. 61/182,604, filed on May 29, 2009.

(51) Int. Cl.
*H04L 27/00* (2006.01)

(52) U.S. Cl. ........ 375/295; 375/259; 375/260; 375/267; 375/299; 375/316

(58) Field of Classification Search .................. 375/295, 375/259, 260, 267, 299
See application file for complete search history.

(56) References Cited

U.S. PATENT DOCUMENTS

| | | | | |
|---|---|---|---|---|
| 5,987,010 | A * | 11/1999 | Schnizlein | 370/280 |
| 6,304,214 | B1 * | 10/2001 | Aiken et al. | 342/362 |
| 7,580,490 | B2 * | 8/2009 | Suh et al. | 375/349 |
| 8,199,857 | B2 * | 6/2012 | Gaikwad et al. | 375/316 |
| 2006/0287016 | A1 * | 12/2006 | Portaro et al. | 455/575.7 |
| 2008/0310557 | A1 * | 12/2008 | Gaikwad | 375/340 |
| 2009/0046790 | A1 * | 2/2009 | Soliman | 375/260 |
| 2010/0303131 | A1 * | 12/2010 | Trachewsky | 375/141 |

OTHER PUBLICATIONS

"DRAFT Supplement to STANDARD [for] Information Technology—Telecommunications and information exchange between systems—Local and metropolitan area networks-Specific requirements—Part 11: Wireless LAN Medium Access Control (MAC) and Physical Layer (PHY) specifications: Further Higher Data Rate Extension in the 2.4 GHz Band", IEEE 802.11g, 2003, 69 pages.

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band", IEEE Std. 802.11b, 1999, 96 pages.

"TGn Sync Proposal Technical Specification", IEEE Std. 802.11n, 2005, 131 pages.

"Information technology—Telecommunications and information exchange between systems—Local and metropolitan networks—specific requirements. Part 3: Carrier Sense Multiple Access with Collision Detection (CSMA/CD) Access Method and Physical Layer Specifications-Amendment: Physical Layer and Management Parameters for 10 Gb/s Operation, Type 10GBASE-T", IEEE 802.3an-D1.1, 2004, 145 pages.

"Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks", IEEE Std 802.3ac-1998, 1998, 19 pages.

(Continued)

*Primary Examiner* — Siu Lee

(57) ABSTRACT

Systems and techniques relating to wireless local area network devices include a method involving generating a baseband signal indicative of one or more symbols, modulating the baseband signal at a carrier frequency to produce a modulated signal, transmitting the modulated signal via a wireless channel, and providing a clock signal to control, in the baseband signal, a duration of the one or more symbols. Providing the clock signal can include selectively using a first clock frequency to generate a first baseband signal having a first bandwidth. Providing the clock signal can include selectively using a second, lower clock frequency to generate a second baseband signal having a second, lower bandwidth. The second clock frequency can be used to extend a wireless communication range of the wireless channel.

16 Claims, 10 Drawing Sheets

OTHER PUBLICATIONS

"Information technology—Telecommunications and information exchange between systems—Local and metropolitan networks—specific requirements. Part 11: Wireless LAN Medium Access Control (MAC) and Physical Layer (PHY) Specifications", IEEE Std. 802.11n, Oct. 29, 2009, 535 pages.

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g, 2003.

"Part 11: Wireless LAN Medium Access Control (MAC) and Physical Layer (PHY) specifications: Higher-Speed Physical Layer Extension in the 2.4 GHz Band", IEEE Std 802.11a, 1999.

"Part II: Wireless LAN Medium Access Control (MAC) and Physical Layer (PHY) specifications: Higher-Speed Physical Layer Extension in the 2.4 GHz Band", IEEE Std. 802.11b, 1999.

"TGn Sync Proposal Technical Specification", IEEE Std. 802.11n, 2005.

Information technology—Telecommunications and information exchange between systems—Local and metropolitan networks—specific requirements. Part 3: Carrier Sense Multiple Access with Collision Detection (CSMA/CD) Access Method and Physical Layer Specifications-Amendment: Physical Layer and Management Parameters for 10 Gb/s Operation, Type 10GBASE-T, 802.3an-D1.1, 2004.

Supplement to Carrier Sense Multiple Access with Collision Detection (CMSA/CD) Access Method and Physical Layer Specifications—Frame Extensions for Virtual Bridged Local Area Network (VLAN) Tagging on 802.3 Networks, IEEE Std 802.3ac-1998.

* cited by examiner

NARROW-BAND OFDM MODE FOR WLAN

CROSS REFERENCE TO RELATED APPLICATION

This disclosure claims the benefit of the priority of U.S. Provisional Application Ser. No. 61/182,604, filed May 29, 2009 and entitled "NARROW-BAND OFDM MODE FOR WLAN," which is incorporated herein by reference in its entirety.

BACKGROUND

Wireless Local Area Networks (WLANs) include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals. Moreover, WLANs, such as ones based on the IEEE 802.11n standard, can use OFDM and MIMO.

Wireless communication devices in a WLAN can use one or more protocols for medium access control (MAC) and physical (PHY) layers. For example, a wireless communication device can use a Carrier Sense Multiple Access (CSMA) with Collision Avoidance (CA) based protocol for a MAC layer and OFDM for the PHY layer. A MIMO-based wireless communication device can transmit and receive multiple spatial streams over multiple antennas in each of the tones of an OFDM signal.

SUMMARY

The present disclosure includes systems and techniques for wireless local area networks.

According to an aspect of the described systems and techniques, methods for wireless local area networks can include generating a baseband signal indicative of one or more symbols using a clock signal, modulating the baseband signal at a carrier frequency to produce a modulated signal and then transmitting the modulated signal via a wireless channel. The method can include using a first clock frequency to generate first baseband signals having a first bandwidth. The method can include selectively using a second, lower clock frequency to generate second baseband signals having a second, lower bandwidth. The lower bandwidth signal can be used to extend the wireless communication range.

According to another aspect of the described systems and techniques, methods for wireless local area networks can include generating a baseband signal indicative of one or more symbols, modulating the baseband signal at a carrier frequency to produce a modulated signal, transmitting the modulated signal via a wireless channel, and providing a clock signal to control, in the baseband signal, a duration of the one or more symbols. Providing the clock signal can include selectively using a first clock frequency to generate a first baseband signal having a first bandwidth. Providing the clock signal can include selectively using a second, lower clock frequency to generate a second baseband signal having a second, lower bandwidth. The second clock frequency can be used to extend a wireless communication range of the wireless channel.

These and other implementations can include one or more of the following features. Generating the baseband signal can include generating one or more preamble symbols based on a pre-determined preamble sequence. Generating the baseband signal can include generating a longer duration preamble symbol in accordance with the second clock frequency. In some implementations, the first bandwidth is an integer multiple of the second bandwidth. Generating the baseband signal can include generating orthogonal frequency division multiplexing (OFDM) symbols. Providing the clock signal can include determining a communication mode based on a quality-of-service requirement and selecting a clock frequency based on the communication mode. Transmitting the modulated signal can include transmitting spatially steered signals that concurrently provide data to two or more wireless communication devices via two or more spatial wireless channels, respectively. The modulated signal can include at least one of the spatially steered signals.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiment can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses for wireless communication can include a receiver section to receive an incoming radio signal, which includes data indicative of a pre-determined preamble sequence, a first carrier sense detector to produce, in accordance with a first baseband clock frequency, a first indication based on a detection of the pre-determined preamble sequence in the signal, a second carrier sense detector to produce, in accordance with a second, slower baseband clock frequency, a second indication based on a detection of the pre-determined preamble sequence in a down-sampled version of the signal, and a decider to select a baseband clock frequency based on information including the first indication and the second indication.

In some implementations, the first baseband clock frequency is an integer multiple of the second baseband clock frequency. Data indicative of the pre-determined preamble sequence can include one or more orthogonal frequency division multiplexing (OFDM) symbols. In some implementations, a receiver section is configured to receive spatially steered signals via a spatial wireless channel. In some implementations, a receiver section receives a spatially steered signal via two or more antennas. The first carrier sense detector can store a first version of the pre-determined preamble sequence. The second carrier sense detector can store a second, longer duration version of the pre-determined preamble sequence.

Systems and apparatuses for wireless communication can include two or more devices that are configured to generate a baseband signal indicative of one or more symbols, modulate the baseband signal at a carrier frequency to produce a modulated signal, transmit the modulated signal via a wireless channel, provide a clock signal to control, in the baseband signal, a duration of the one or more symbols, selectively use a first clock frequency to generate a first baseband signal having a first bandwidth, and selectively use a second, lower clock frequency to generate a second baseband signal having a second, lower bandwidth. The second clock frequency can be used to extend a wireless communication range of the wireless channel.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1A:
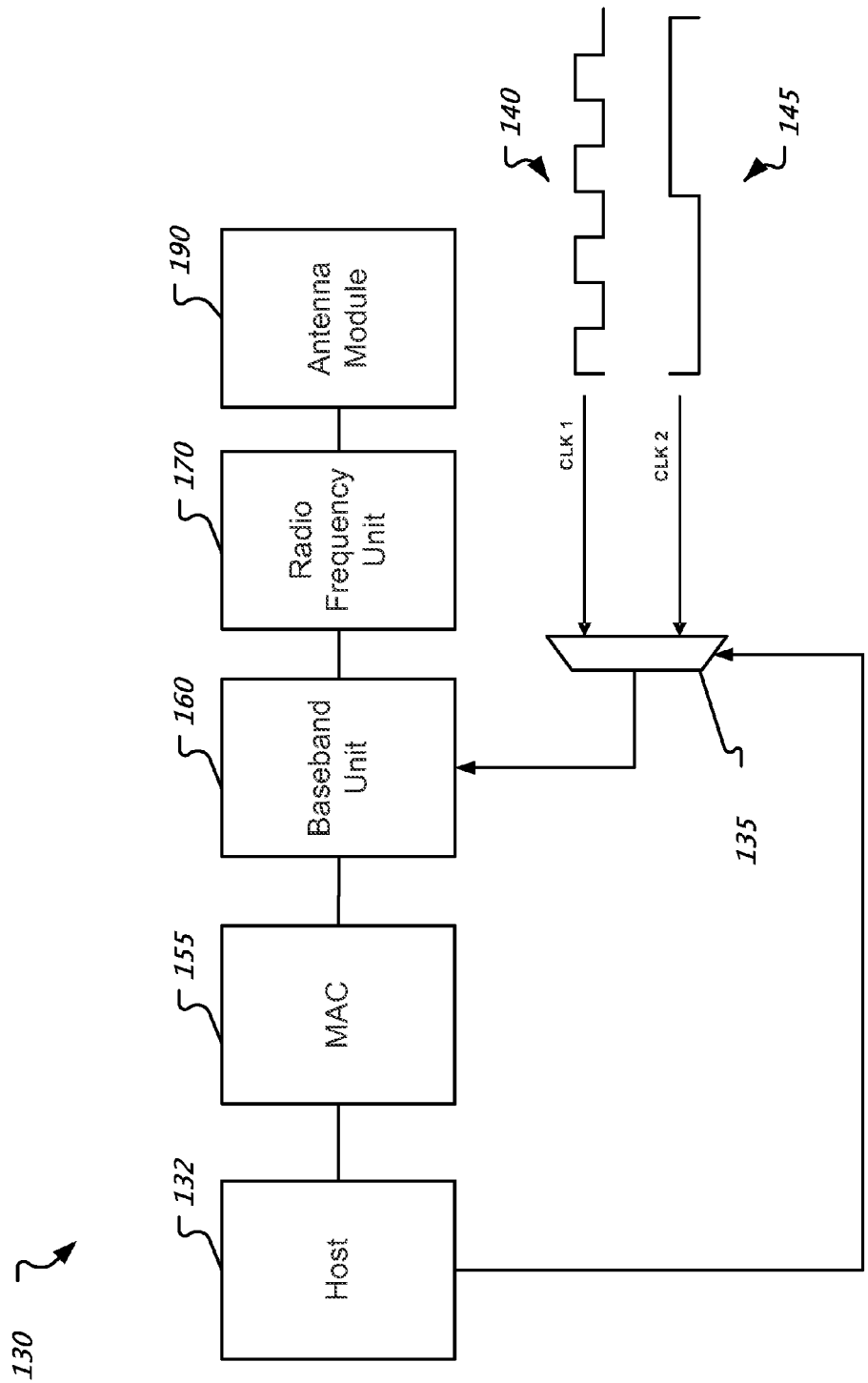
FIG. 1A shows an example of a multi-mode wireless communication device architecture.

This disclosure provides details and examples of technologies for wireless local area networks, including a multi-mode wireless communication device architecture. A multi-mode wireless communication device can dynamically change the bandwidth of transmitted signals based on a selected communication mode. This disclosure describes, among other things, technologies for achieving extended wireless communication ranges in WLAN systems without redefining an underlying channelization, a preamble structure, or both. The techniques and architectures presented herein can be implemented in a variety of wireless communication systems such as ones based on IEEE 802.11n or IEEE 802.11ac.

A wireless communication device can transmit signals based on a static bandwidth parameter value. For example, a device can generate a baseband signal based on a static bandwidth parameter value, e.g., 20 MHz. In some scenarios, a device may require a transmission of low data rate signals over ranges longer than those achievable by an existing OFDM based WLAN system, such as a system operating at a 5 GHz band.

A multi-mode wireless communication device can use two or more bandwidth parameter values for different communication modes. Such a device can transmit signals in a communication mode well suited for the underlying information content of the transmitted signals. A first mode, for example, can support lower data rate communications over longer distances, whereas a second mode can support higher data rate communications over shorter distances. In some implementations, a first mode uses a 5 MHz bandwidth to generate baseband signals that are subsequently modulated to a carrier frequency band. In some implementations, a second mode uses a 20 MHz bandwidth to generate baseband signals that are subsequently modulated to the identical carrier frequency band. Other pairings of bandwidth values are possible. In another example, a first mode uses a 40 MHz bandwidth, and the second mode uses a 10 MHz bandwidth. In yet another example, a first mode uses a 20 MHz bandwidth, and the second mode uses a 2.5 MHz bandwidth. Additional modes and bandwidth values are possible. In some implementations, the bandwidth of the first mode is an integer multiple of the bandwidth of the second mode.

In some implementations, a multi-mode wireless communication device can use identical baseband operations for two or more communication modes. Various examples of such baseband operations include scrambling, error correction encoding, stream parsing, interleaving, constellating mapping, spatial mapping, addition of cyclic prefixes, Fourier transformations, and digital filtering. Baseband communication circuitry can be operated based on a baseband clock signal. In some implementations, a baseband clock is operated at a frequency that is lower than its nominal frequency to provide an extended range communication mode. For example, the frequency, in such a mode, is a quarter of the clock's nominal frequency. As a result, the clock is operated four times slower, and a symbol duration, e.g., a symbol length, is four times longer. For example, an OFDM symbol duration for a data packet based on a 5 MHz bandwidth, instead of a 20 MHz bandwidth, is 16 microseconds, instead of 4 microseconds. The communication mode can be changed without changing the underlying channelization.

In receiving, a wireless communication device can determine a bandwidth of an incoming signal during packet detection. In some implementations, a device uses carrier sense techniques to detect packets. Carrier sensing can be triggered based on a detection of a preamble such as a WLAN preamble. For example, a preamble in 802.11a/n based networks includes repetitions of a pre-determined sequence. In a multi-mode communication, for example, a period of the repeating sequence in the 5 MHz packet is four times that of the repeating sequence in the 20 MHz packet. Therefore, detecting a bandwidth of the packet includes detecting a fundamental period of the packet preamble.

In some implementations, a device can operate two or more carrier sense detectors (CSDs). A first CSD operates on an incoming signal in a 20 MHz mode, whereas the second CSD operates, in a 5 MHz mode, on a down-sampled version of the incoming signal. The CSD that detects a data packet can cause a decision block to select a baseband clock frequency that is represented by the CSD.

FIG. 1A shows an example of a multi-mode wireless communication device architecture, which can include the various implementation details described above. A wireless communication device 130 can include a host 132, a MAC 155, a baseband unit (BBU) 160, a radio frequency unit (RFU) 170, and an antenna module 190. The host 132 can include a processor. The device 130 can include a multiplexer (MUX) 135 coupled with two or more clock signal pathways 140, 145. The host 132 can communicate with the MUX 135 to control the MUX 135 to connect one of the multiple clock signal pathways 140, 145 to the BBU 160. The BBU 160 can produce a baseband signal based on a clock signal received from the MUX 135.

The MAC module 155 can include one or more MAC control units (MCUs). The BBU 160 can receive one or more data streams from the MAC module 155. The BBU 160 can include a module to perform encoding, such as a forward error correction (FEC) encoding technique on a data stream produced by the MAC module 155. The BBU 160 can include a module to perform modulation on an encoded data stream. In some implementations, a BBU 160 includes a module for spatial mapping to generate spatially separated radio signals.

The BBU 160 can include an Inverse Fast Fourier Transform (IFFT) module to perform IFFTs on one or more modulated data streams. In some implementations, an IFFT module, in the BBU 160, is configured to support one or more bandwidths, e.g., 5 MHz, 10 MHz, 20 MHz, 40 MHz, or 80 MHz. The MUX 135 can control a FFT length in the IFFT module based on a clock signal that corresponds to a selected bandwidth. In some implementations, the host 132 can select a clock signal frequency based on a communication mode, e.g., a high bandwidth mode, a long range communication mode, or a high reliability mode. In some implementations, a higher bandwidth frequency is associated with a shorter symbol duration. In some implementations, a wireless communication device 130 includes an adjustable frequency clock signal generator in lieu of the shown MUX 135 architecture. For example, the host 132 can operate an adjustable frequency clock signal generator to produce a clock signal at a specified frequency.

The RFU 170 can include a digital filtering and radio module to filter a baseband signal, modulate, and amplify the signal for transmission via an antenna module 190. In some implementations, an antenna module 190 includes one antenna. In some implementations, an antenna module 190 can include multiple transmit antennas and multiple receive antennas. In some implementations, an antenna module 190 is a detachable unit that is external to a wireless communication device 130. In some implementations, the RFU 170 includes a digital-to-analog converter (DAC) to produce an analog signal in accordance with a baseband clock signal that is received from the MUX 135.

In some implementations, a wireless communication device 130 includes one or more integrated circuits (ICs). In some implementations, a MAC module 155 includes one or more ICs. In some implementations, a wireless communication device 130 includes an IC that implements the functionality of multiple units, modules, or both, such as a MAC module, MCU, BBU, or RFU. In some implementations, a wireless communication device 130 includes a host processor that provides a data stream to a MAC module 155 for transmission. In some implementations, a wireless communication device 130 includes a host 132 that receives a data stream from the MAC module 155. In some implementations, the host 132 includes the MAC module 155.

Figure 1B:
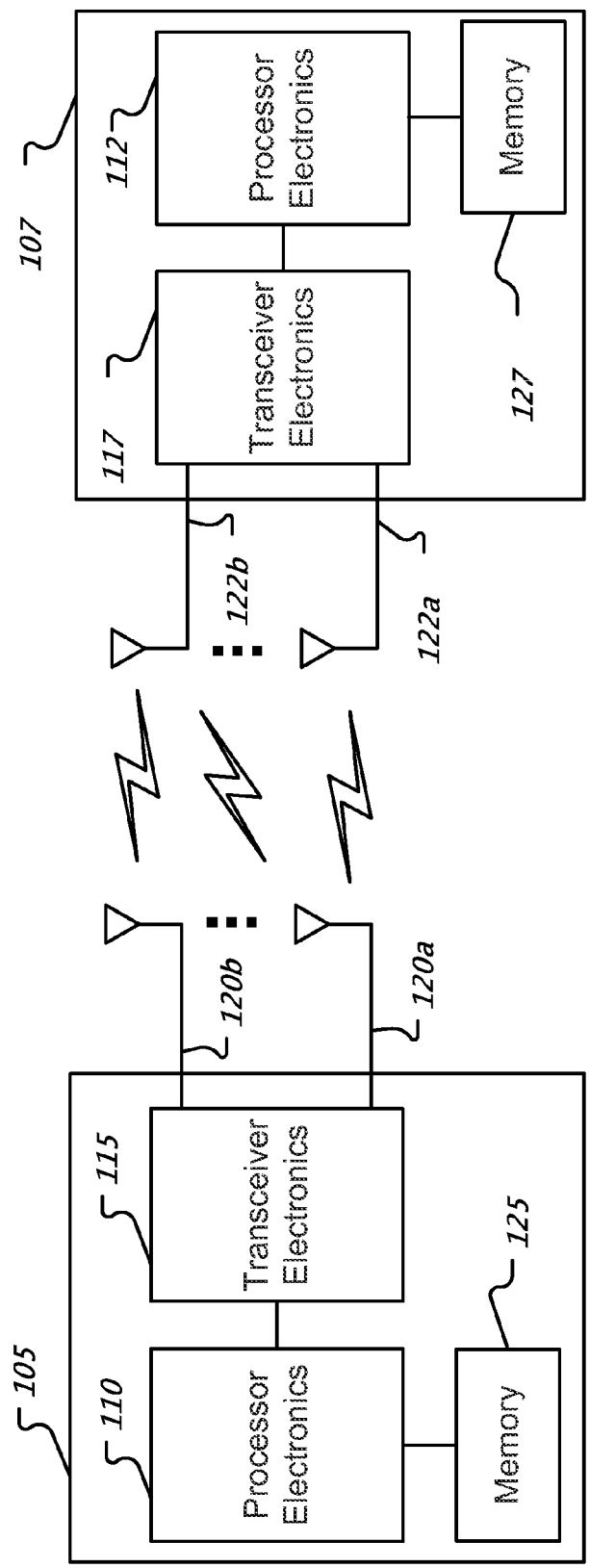
FIG. 1B shows an example of a wireless local area network with two wireless communication devices.

FIG. 1B shows an example of a wireless local area network with two wireless communication devices. Wireless communication devices 105, 107 such as an access point (AP), base station (BS), access terminal (AT), client station, or mobile station (MS) can include processor electronics 110, 112 such as one or more processors that implement methods effecting the techniques presented in this disclosure. Wireless communication devices 105, 107 include transceiver electronics 115, 117 to send and receive wireless signals over one or more antennas 120a, 120b, 122a, 122b. In some implementations, transceiver electronics 115, 117 include multiple radio units. In some implementations, a radio unit includes a BBU and a RFU to transmit and receive signals. Wireless communication devices 105, 107 include one or more memories 125, 127 configured to store information such as data, instructions, or both. In some implementations, wireless communication devices 105, 107 include dedicated circuitry for transmitting and dedicated circuitry for receiving.

A first wireless communication device 105 can transmit data to two or more devices via two or more spatial wireless communication channels such as orthogonal spatial subspaces, e.g., orthogonal Space Division Multiple Access (SDMA) subspaces. For example, the first wireless communication device 105 can concurrently transmit data to a second wireless communication device 107 using a spatial wireless channel and can transmit data to a third wireless communication device (not shown) using a different spatial wireless channel. In some implementations, the first wireless communication device 105 implements a space division technique to transmit data to two or more wireless communication devices using two or more spatial multiplexing matrices to provide spatial separated wireless channels in a single frequency range.

Wireless communication devices 105, 107 are sometimes referred to as transmitters and receivers for convenience. For example, a "transmitter" as used herein is not limited to a dedicated transmitting device, but rather can include a wireless communication device that receives and transmits signals. Likewise, a "receiver" as used herein is not limited to a dedicated receiving device, but rather can include a wireless communication device that receives and transmits signals.

Wireless communication devices such as a MIMO enabled AP can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled AP can participate in sounding to obtain channel state information for each of the client wireless communication devices. The AP can compute spatial multiplexing matrices, such as spatial steering matrices, based on the different channel state information to spatially separate signals to different client wireless communication devices.

A MIMO enabled AP can use frequency multiplexing to communicate with a group of devices. In one or more of the multiplexed frequency ranges, the AP can use spatial multiplexing to communicate with different devices via different spatial wireless channels. For example, an AP uses spatial multiplexing for multiple devices in one frequency sub-band and uses another frequency sub-band for a single device.

A transmitter can use a transmission signal model to generate SDMA transmission signals for two or more receivers. Generating SDMA transmission signals can include using spatial multiplexing matrixes associated with respective receivers. In some implementations, a transmitter can construct a multiplexing matrix W for client receivers based on interference avoidance, signal-to-interference and noise ratio (SINR) balancing, or a combination of these. Interference avoidance attempts to minimize the amount of non-desired signal energy arriving at a receiver. Interference avoidance can ensure that signals intended for a particular receiver arrive only at that particular receiver and cancel out at a different receiver. A transmitter can perform SINR balancing. SINR balancing can include determining multiplexing matrices to actively control the SINRs observed at different receivers. For example, one SINR balancing approach can include maximizing the minimum SINR across serviced receivers.

A transmitter can simultaneously communicate with multiple receivers via different spatial wireless channels. The transmitter can use multiplexing matrices, such as steering matrices, to transmit information on different spatial wireless channels. The transmitter can multiply a transmission vector for the i-th receiver by a respective multiplexing matrix. The multiplexing matrix for each receiver can differ. A multiplexing matrix can be a function of the wireless channel between the transmitter and the receiver. The transmitter can combine steered signal vectors corresponding to the different receivers to produce transmission signals that simultaneously transmit different information to respective receivers.

In some implementations, a transmitter uses an OFDM transmission signal model based on $$S = \sum_{i=1}^{N} W_i x_i$$

where s is a transmitted signal vector for one tone, N is a number of simultaneously serviced receivers, $x_i$ is an information vector ($T_i \times 1$, $T_i \leq P_i$) intended for the i-th receiver, $W_i$ is a multiplexing matrix ($M \times T_i$) for the i-th receiver, M is a number of transmit antennas of the transmitter, and $P_i$ is the number of receive antennas of the i-th receiver.

In some implementations, a wireless communication device can determine multiple wireless channel matrices $H_k^i$ based on one or more received signals. Here, $H_k^i$ represents the channel conditions for the k-th tone associated with the i-th receiver. A transmitter can transmit on multiple tones to two or more receivers. For example, the first tone received by the first receiver can be expressed as $H_1^1[W_1^1 x_1 + W_1^2 x_2 + \ldots + W_1^N x_S]$, where $W_k^i$ is the multiplexing matrix for the i-th receiver at the k-th tone.

A multiplexing matrix W can be selected to cause the first receiver to receive $H_1^1 W_1^1 x_1$ and to have the remaining signals $x_2, x_3, \ldots, x_S$ be in a null space for the first receiver. Therefore, when using a signal interference approach, the values of the multiplexing matrix W are selected such that $H_1^1 W_1^2 \approx 0, \ldots H_1^1 W_1^N \approx 0$. In other words, the multiplexing matrix W can adjust phases and amplitudes for these OFDM tones such that a null is created at the first receiver. That way, the first receiver can receive the intended signal $x_1$ without interference from other signals $x_2, x_3, \ldots, x_S$ intended for the other receivers.

In general, a received signal can include a signal component intended for i-th receiver and one or more co-channel interference components from one or more signals intended for one or more other receivers. For example, a received signal at the i-th receiver is expressed by:

$$y_i = H_i W_i x_i + H_i \sum_{j \neq i} W_j x_j + n_i$$

where $H_i$ represents a wireless channel matrix associated with a wireless channel between a transmitter and the i-th receiver, and $n_i$ represents noise at the i-th receiver. The summation is over values of j corresponding to receivers other than the i-th receiver.

When servicing multiple receivers simultaneously, power available at a transmitter can be allocated across multiple receivers. This, in turn, affects the SINR observed at each of the receivers. The transmitter can perform flexible power management across the receivers. For example, a receiver with low data rate requirements can be allocated less power by the transmitter. In some implementations, transmit power is allocated to receivers that have high probability of reliable reception (so as not to waste transmit power). Power can be adjusted in the corresponding multiplexing matrix W, using other amplitude adjustment methods, or both, such as adjusting power with the matrix W after using other methods.

A transmitter device can determine a multiplexing matrix W associated with a receiver based on channel conditions between the transmitter and the receiver. The transmitter and the receiver can perform sounding to determine wireless channel characteristics. Various examples of sounding techniques include explicit sounding and implicit sounding.

Figure 2:
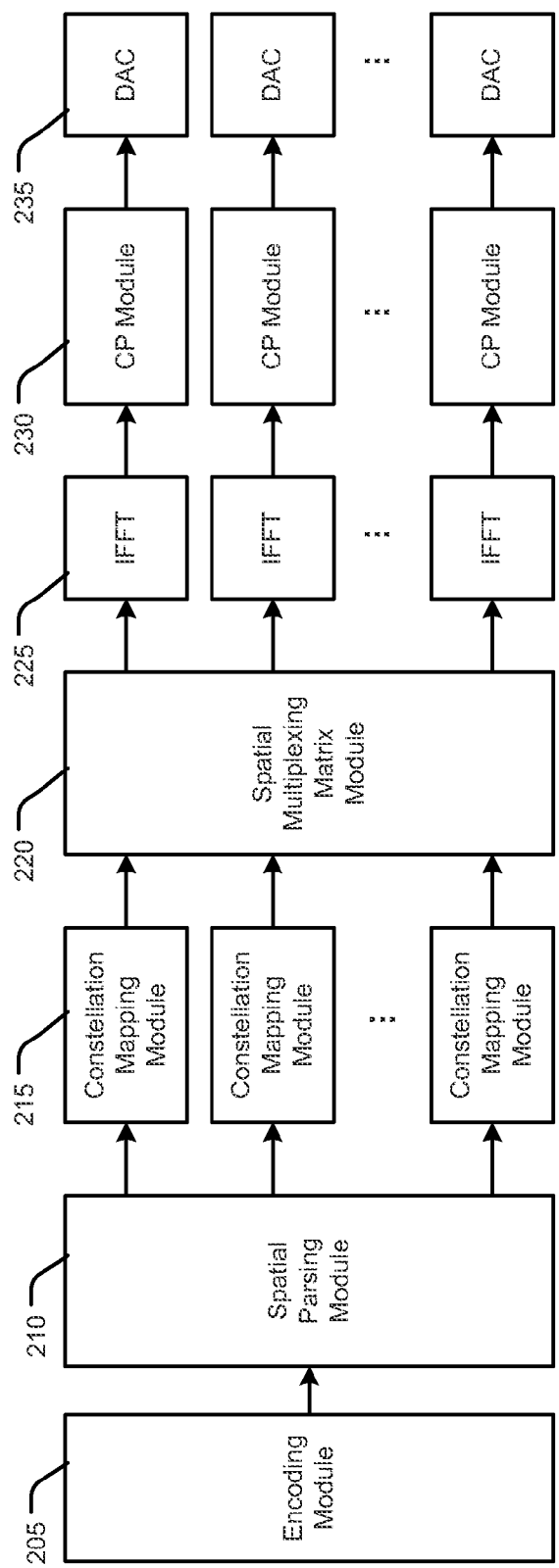
FIG. 2 shows an example of a functional block diagram of a transmit path of a wireless communication device.

FIG. 2 shows an example of a functional block diagram of a transmit path of wireless communication device. In this example, a transmit path is configured for MIMO communications. A wireless communication device such as an AP can include one or more transmit paths. An AP's transmit path can include an encoding module 205 configured to receive a data stream, such as an audio data stream, a video data stream, or combination thereof. The encoding module 205 outputs encoded bit streams to a spatial parsing module 210, which performs spatial mapping to produce multiple outputs.

Outputs of the spatial parsing module 210 are input into constellation mapping modules 215, respectively. In some implementations, a constellation mapping module 215 includes a serial-to-parallel converter that converts an incoming serial stream to multiple parallel streams. The constellation mapping module 215 can perform quadrature amplitude modulation (QAM) on multiple streams produced by a serial-to-parallel conversion. The constellation mapping module 215 can output OFDM tones that are input to a spatial multiplexing matrix module 220. The spatial multiplexing matrix module 220 can multiply the OFDM tones by a spatial multiplexing matrix to produce signal data for multiple transmit antennas.

Outputs of the spatial multiplexing matrix module 220 are input to IFFT modules 225. In some implementations, an IFFT module 225 can include a multiple access module to map different streams to different subcarrier groups. Outputs of the IFFT modules 225 are input to cyclic prefix (CP) modules 230. Outputs of the CP modules 230 are input to digital-to-analog converters (DACs) 235, which produce analog signals for transmission on multiple transmit antennas, respectively.

Figure 3:
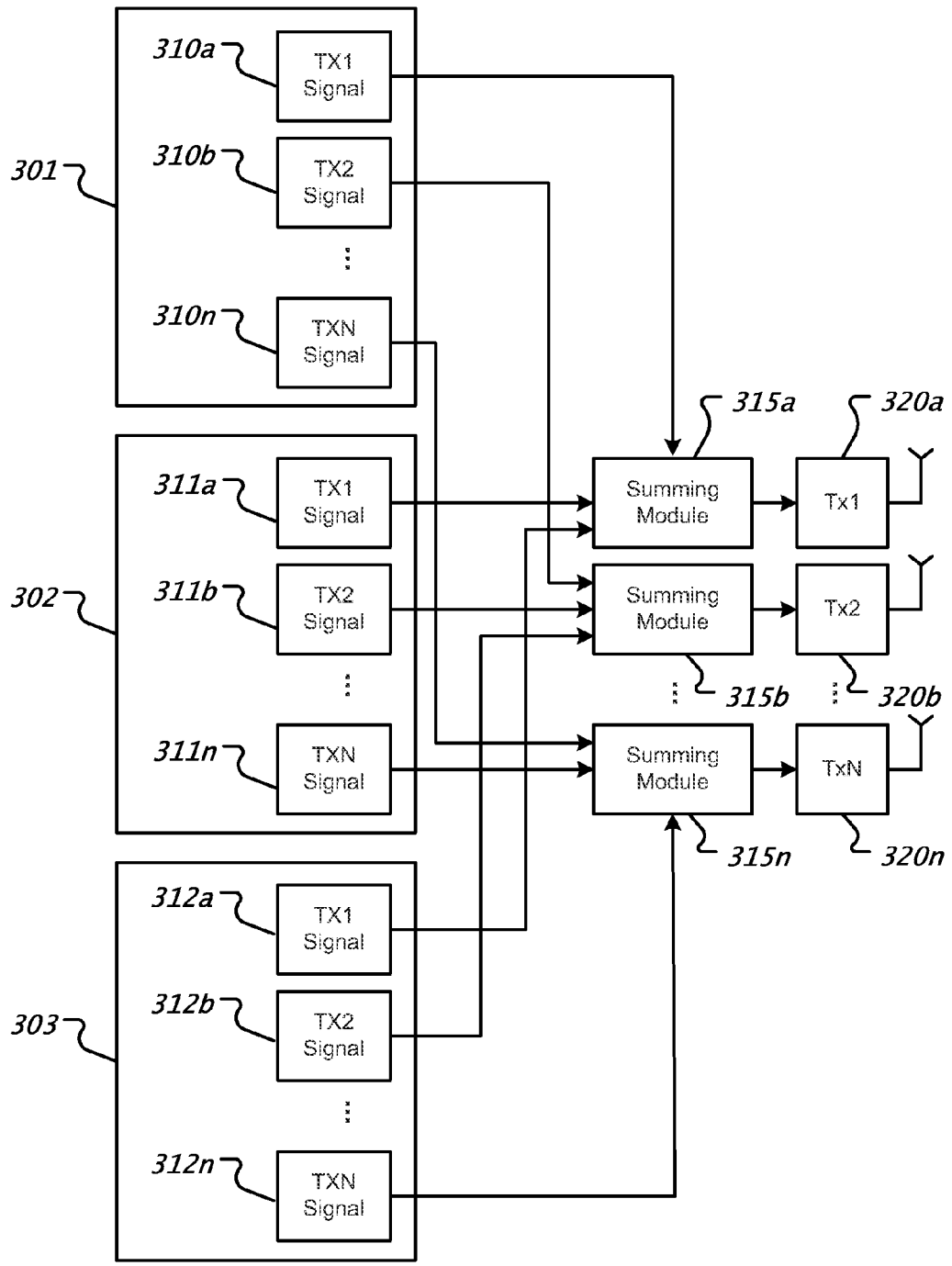
FIG. 3 shows an example of an architecture that combines multiple transmission signals for transmission on multiple antennas.

FIG. 3 shows an example of an architecture that combines multiple transmission signals for transmission on multiple antennas. A transmitter can include two or more transmit paths 301, 302, 303 that are each configured for MIMO communications. A first transmit path 301 generates multiple transmit signals 310a, 310b, 310n for transmission on multiple transmit antennas 320a, 320b, 320n, respectively. A second transmit path 302 generates multiple transmit signals 311a, 311b, 311n for transmission on multiple transmit antennas 320a, 320b, 320n, respectively. A third transmit path 303 generates multiple transmit signals 312a, 312b, 312n, for transmission on multiple transmit antennas 320a, 320b, 320n, respectively.

A transmitter can include multiple summing modules 315a, 315b, 315n that are associated with multiple transmit antennas 320a, 320b, 320n, respectively. In some implementations, summing modules 315a, 315b, 315n sum corresponding outputs of DACs in each of the transmit paths 301, 302, 303 to produce combined transmit signals for each of antennas 320a, 320b, 320n.

Figure 4:
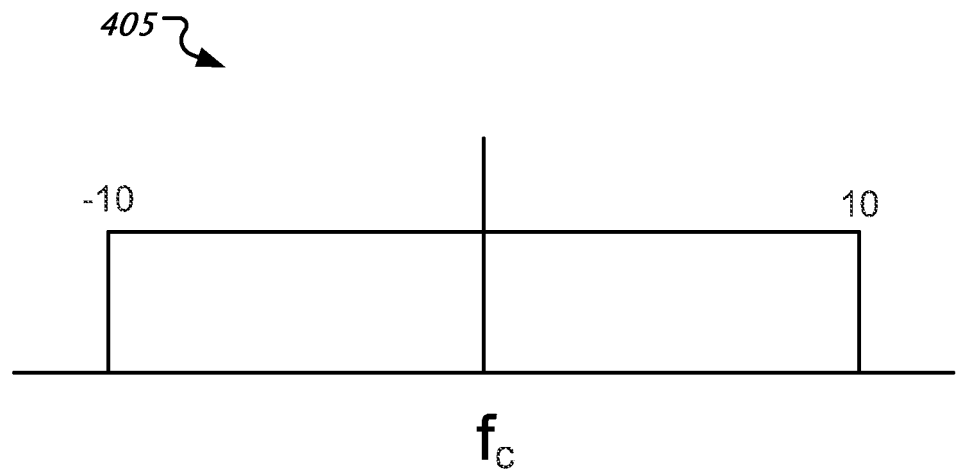
FIG. 4 shows an example of a graph of a baseband signal having a 20 MHz bandwidth.

FIG. 4 shows an example of a graph of a baseband signal having a 20 MHz bandwidth. The graph 405 depicts a baseband signal that has a 20 MHz bandwidth. The baseband signal is centered around a carrier frequency ($f_c$). For example, if the carrier frequency is 5 GHz, then the graph 405 depicts a baseband signal that is modulated from 10 MHz below 5 GHz to 10 MHz above 5 GHz.

Figure 5:
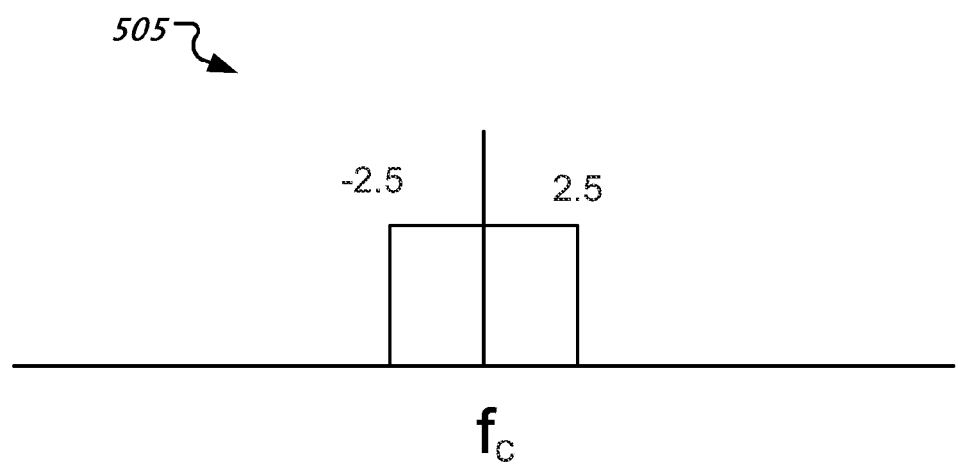
FIG. 5 shows an example of a graph of a baseband signal having a 5 MHz bandwidth.

FIG. 5 shows an example of a graph of a baseband signal having a 5 MHz bandwidth. The graph 505 depicts a baseband signal that has a 5 MHz bandwidth. The baseband signal is centered around a carrier frequency ($f_c$). For example, if the carrier frequency is 5 GHz, then the graph 505 depicts a baseband signal that is modulated from 2.5 MHz below 5 GHz to 2.5 MHz above 5 GHz. Compared to baseband signal depicted by FIG. 4, the baseband signal depicted by FIG. 5 carries a quarter less physical data in an identical period of time, however, both are centered around the same carrier frequency.

Figure 6:
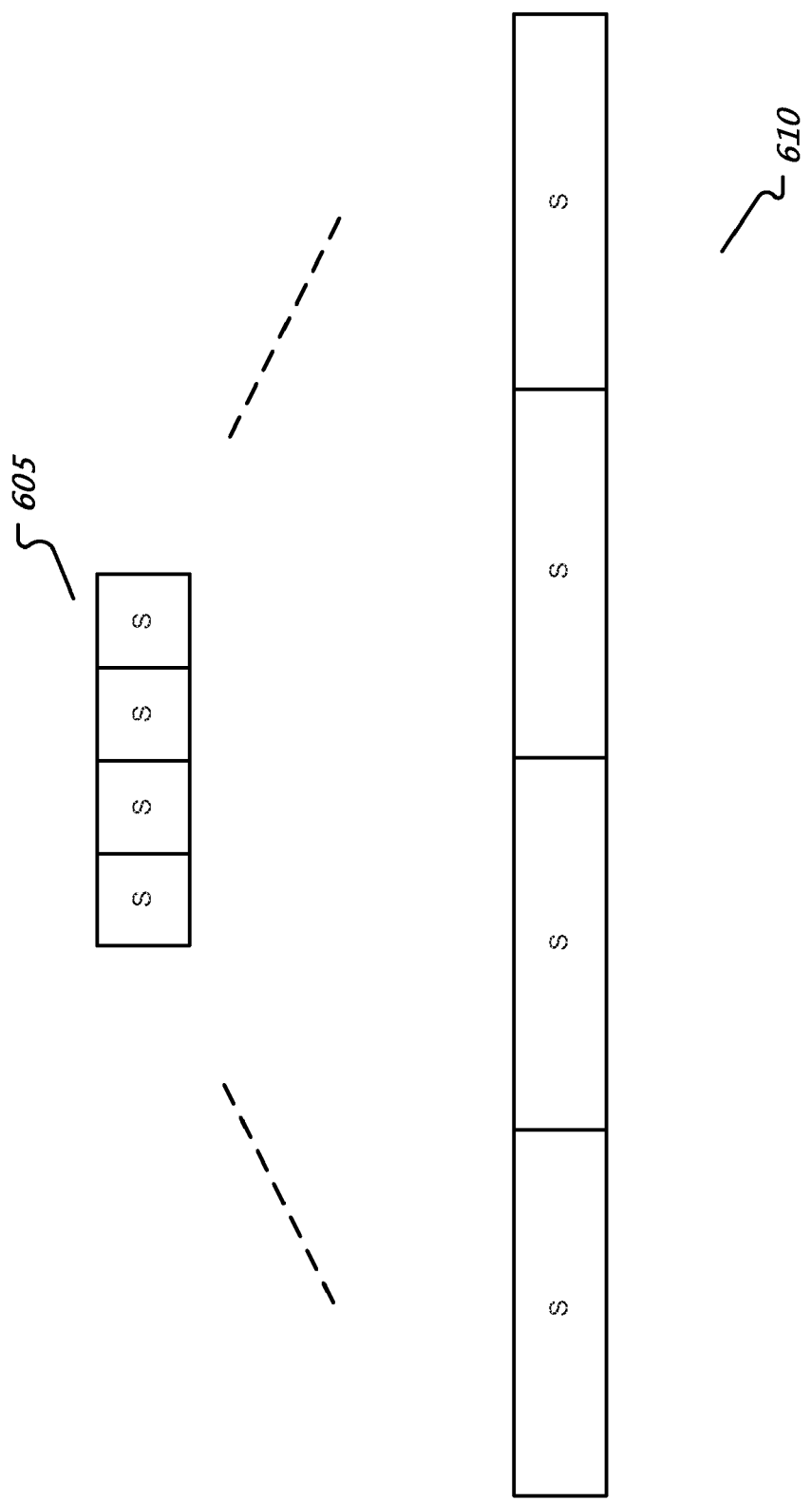
FIG. 6 shows two different duration versions of a preamble symbol.

FIG. 6 shows two different duration versions of a preamble symbol. A preamble symbol transmission can assist a receiver to lock on to a transmission signal to receive data communications. In some implementations, a preamble symbol includes multiple repetitions of a pre-determined sequence. Based on a first baseband clock frequency, a wireless communication device can generate a signal that includes a preamble symbol 605 having a first duration. Based on a second, lower baseband clock frequency, a wireless communication device can generate a signal that includes a preamble symbol 610 having a second, longer duration. As depicted by FIG. 6, a predetermined sequence can be stretched out to occupy a longer time duration. In some implementations, preamble symbols 605, 610 are OFDM preamble symbols.

Figure 7:
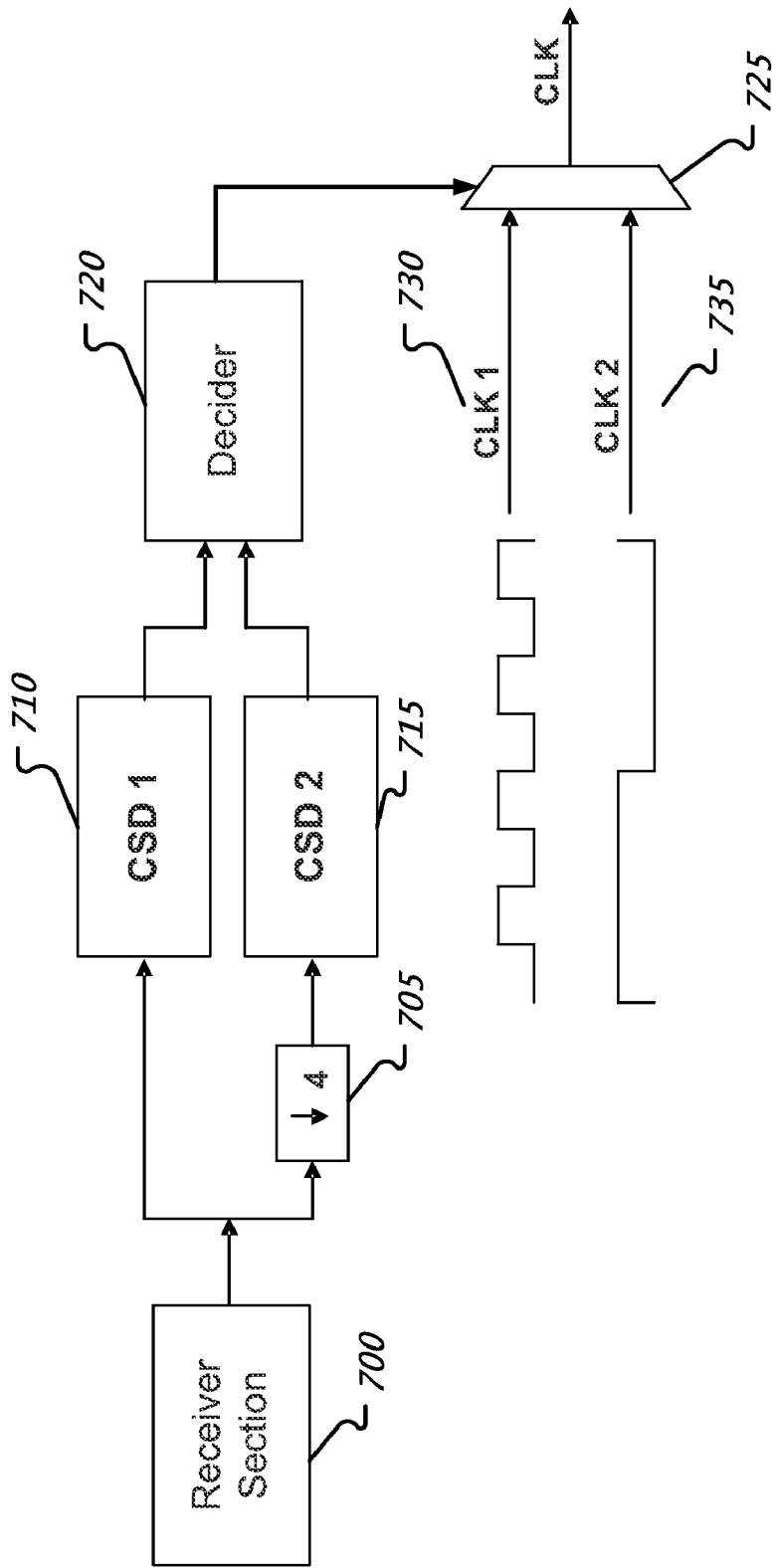
FIG. 7 shows an example of receiver circuitry in a multi-mode wireless communication device.

FIG. 7 shows an example of receiver circuitry in a multi-mode wireless communication device. A multi-mode wireless communication device can include a receiver section 700, a down-sampler 705, two or more carrier sense detectors 710, 715, a decider 720, and a MUX 725. The MUX 725 has at least two input clock signal pathways 730, 735. The receiver section 700 can receive an incoming radio signal. A radio signal can include a signal indicative of OFDM symbols. In some implementations, a radio signal includes data indicative of multiple repetitions of a pre-determined preamble sequence.

A first carrier sense detector 710 can produce a first indication based on a detection of the pre-determined preamble sequence in the signal in accordance with a first baseband clock frequency. For example, the first carrier sense detector 710 can assert a binary one if at least a portion of the signal matches a reference symbol pattern that is indicative of the pre-determined preamble sequence having a duration associated with the first baseband clock frequency. Otherwise, the first carrier sense detector 710 can assert a binary zero if no matches are found.

A second carrier sense detector 715 can receive a down-sampled version of the signal via a down-sampler 705. In this example, the down-sampler 715 performs down-sampling by a factor of four. The second carrier sense detector 715 can produce a second indication based on a detection of the pre-determined preamble sequence in accordance with a second, slower baseband clock frequency.

A decider 720 can select a baseband clock frequency based on inputs that include the first indication and the second indication. The decider 720 can output a signal to drive the MUX 725 to select a specific one of its inputs. The MUX 725 can provide a selected clock signal pathway to circuitry for baseband processing of the incoming radio signal.

In some implementations, the first and second carrier sense detectors 710, 715 store identical duration versions of a pre-determined preamble sequence for comparisons with an input signal. In this example, the down-sampler 705 provides differentiation of the incoming signal. In some implementations, a device can include digital processing circuitry that implements the first and second carrier sense detectors 710, 715.

In some implementations, a down-sampler is not required. In such implementations, the second carrier sense detector 715 stores a version of the pre-determined preamble sequence that has been extended to be four times as long as a version stored in the first carrier sense detector 710.

Figure 8:
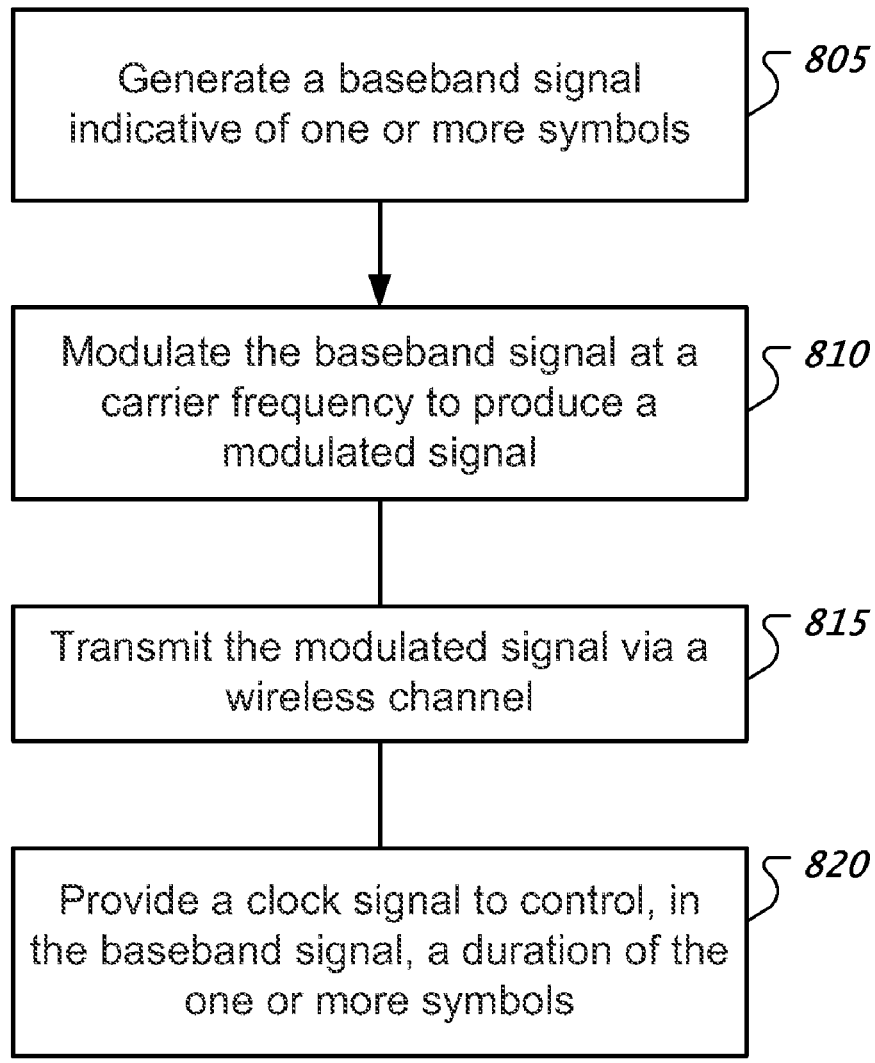
FIG. 8 shows an example of a transmission communication process.

FIG. 8 shows an example of a transmission communication process. At 805, a transmission communication process includes generating a baseband signal indicative of one or more symbols. The process can use a clock signal to generate a baseband signal. In some implementations, the process includes operating a DAC to sample a digital baseband signal to produce an analog signal. In some implementations, a DAC is configured to sample at a baseband clock frequency. In some implementations, a DAC is configured to sample at a lower frequency than a nominal baseband clock frequency. At 810, the process includes modulating the baseband signal at a carrier frequency to produce a modulated signal. At 815, the process includes transmitting the modulated signal via a wireless channel.

At 820, the process includes providing a clock signal to control, in the baseband signal, a duration of the one or more symbols. The process can use the provided clock signal to control the bandwidth of a generated baseband signal. For example, generating a baseband signal indicative of one or more symbols, at 805, can include using the clock signal provided at 820. In some implementations, circuitry to produce a clock signal is operated concurrently with circuitry to generate a baseband signal.

Providing a clock signal, at 820, can include producing a signal to control an input selection at a MUX that receives multiple clock signals produced based on different clock frequencies. Providing a clock signal can include adjusting a parameter in a clock frequency controller. Providing a clock signal can include selectively using a first clock frequency to generate a first baseband signal having a first bandwidth. Providing a clock signal can include selectively using a second, slower clock frequency to generate a second baseband signal having a second, lower bandwidth. A slower clock frequency can extend a wireless communication range of a wireless channel.

In some implementations, transmitting the modulated signal can include transmitting spatially steered signals that concurrently provide data to two or more wireless communication devices via two or more spatial wireless channels, respectively. In some implementations, a device that runs a communication process can be configured for SDMA based communications. For example, an access point can communicate data via spatial wireless channels that are operated in an extended range communication mode, e.g., a mode that uses a clock frequency that is lower than a nominal clock frequency.

In some implementations, a device that runs a communication process can be configured for Orthogonal Frequency-Division Multiple Access (OFDMA) communications. In OFDMA based implementations, available bandwidth can be shared equally between active devices that are in an extended range communication mode.

Figure 9:
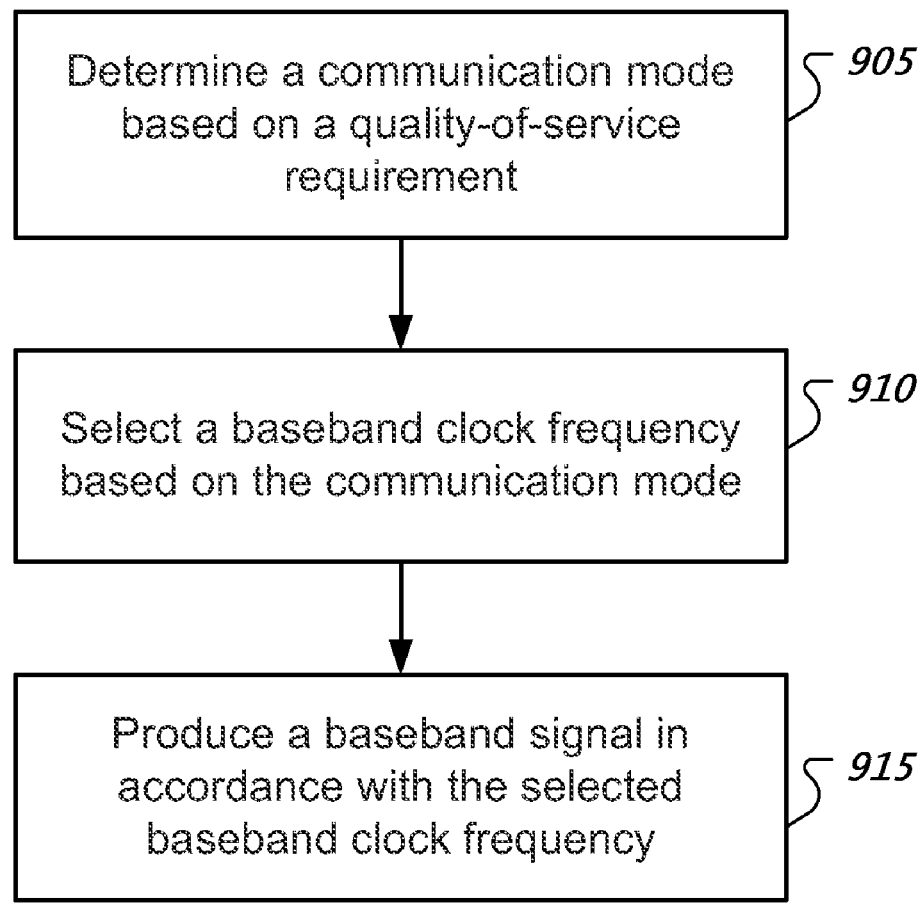
FIG. 9 shows an example of a clock frequency selection in a transmission communication process.

FIG. 9 shows an example of a clock frequency selection in a transmission communication process. At 905, a communication process includes determining a communication mode based on a quality-of-service requirement. Various examples of communication modes include a high bandwidth mode and a long range mode. In some implementations, a quality-of-service requirement for an emergency call requires that the underlying wireless communication device provide the longest possible communication range for the call. Providing the longest possible communication range for a call can include operating a device to produce a lower bandwidth signal.

At 910, the process includes selecting a baseband clock frequency based on the communication mode. For example, a lower baseband clock frequency can be selected for a long range mode, whereas a higher baseband clock frequency can be selected for a high bandwidth mode. At 915, the process includes producing a baseband signal in accordance with the selected baseband clock frequency.

Figure 10:
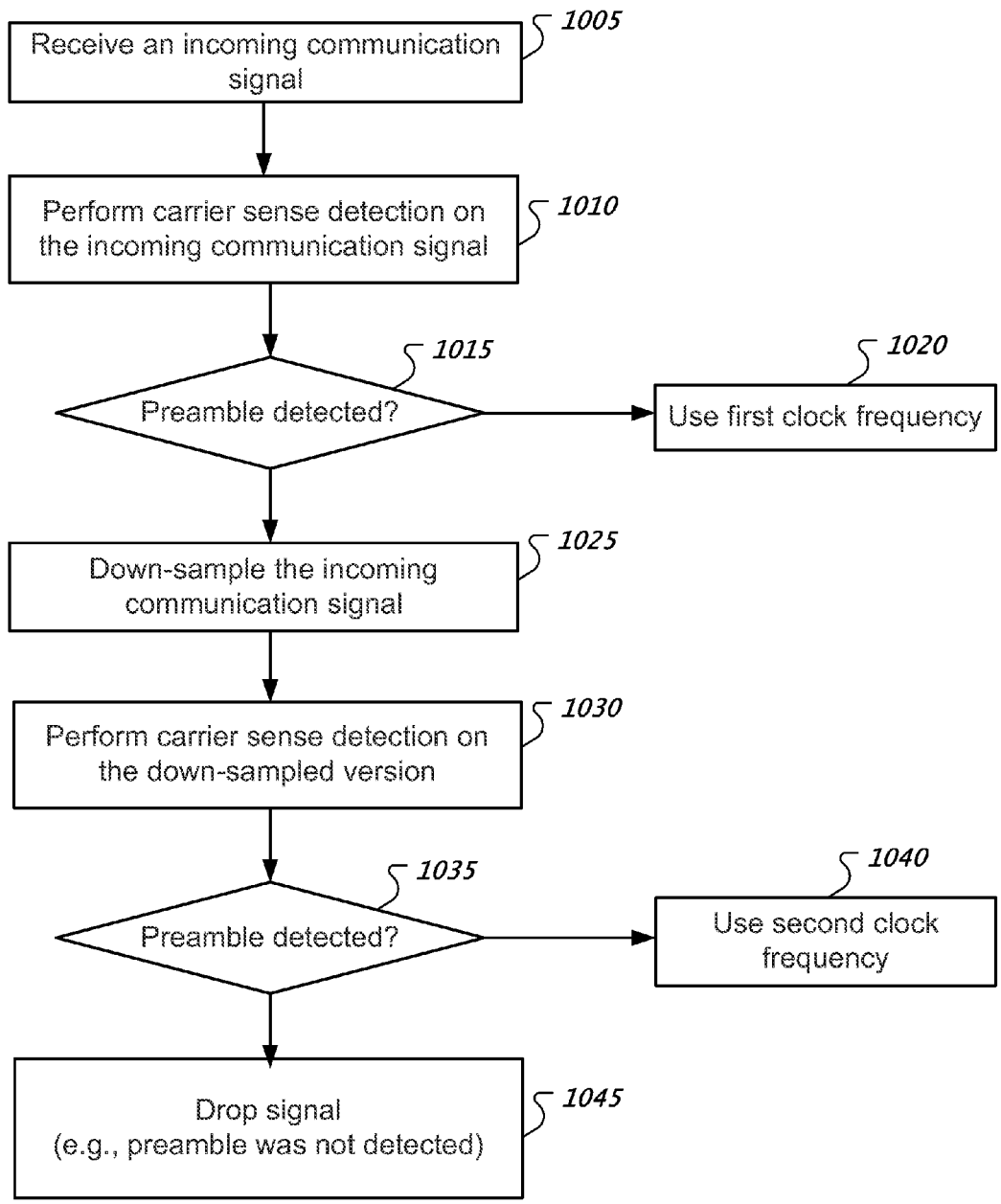
FIG. 10 shows an example of a receiving communication process.

FIG. 10 shows an example of a receiving communication process. At 1005, a receiving communication process includes receiving an incoming communication signal. At 1010, the process includes performing carrier sense detection on the incoming communication signal. If, at 1015, a preamble is detected, then the process, at 1020, uses a first clock frequency to process the incoming communication signal. Otherwise, at 1025, the process includes down-sampling the incoming communication signal. At 1030, the process includes performing carrier sense detection on the down-sampled version of the incoming communication signal. If, at 1035, a preamble is detected, then the process, at 1040, uses a second clock frequency to process the incoming communication signal. Otherwise, the process, at 1045, drops the signal based on a failure to detect a preamble. However, in some implementations, the process can perform additional carrier sense detections based on further down-sampled versions of the signal. For example, a receiving communication process can be configured to select between three or more different clock frequencies to process an incoming signal.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
    generating a baseband signal indicative of one or more symbols;
    modulating the baseband signal at a carrier frequency to produce a modulated signal;
    transmitting the modulated signal via a wireless channel; and providing a clock signal to control, in the baseband signal, a duration of the one or more symbols, wherein providing the clock signal comprises (i) selectively using a first clock frequency to generate a first baseband signal having a first bandwidth and (ii) selectively using a second, lower clock frequency to generate a second baseband signal having a second, lower bandwidth, and wherein the second clock frequency is used to extend a wireless communication range of the wireless channel, and wherein generating the baseband signal comprises (i) generating in accordance with the first clock frequency one or more first preamble symbols based on a pre-determined preamble sequence when the first clock frequency is used, and (ii) generating in accordance with the second clock frequency one or more second preamble symbols based on the pre-determined preamble sequence such that the one or more second preamble symbols have a longer duration than the one or more first preamble symbols when the second clock frequency is used.

2. The method of claim 1, wherein the first bandwidth is an integer multiple of the second bandwidth.

3. The method of claim 1, wherein generating the baseband signal comprises generating orthogonal frequency division multiplexing (OFDM) symbols.

4. The method of claim 1, wherein providing the clock signal comprises (i) determining a communication mode based on a quality-of-service requirement and (ii) selecting a clock frequency based on the communication mode.

5. The method of claim 1, wherein transmitting the modulated signal comprises transmitting spatially steered signals that concurrently provide data to two or more wireless communication devices via two or more spatial wireless channels, respectively, wherein the modulated signal comprises at least one of the spatially steered signals.

6. An apparatus comprising:
a receiver section to receive an incoming radio signal, the signal comprising data indicative of a pre-determined preamble sequence;
a first carrier sense detector to produce, in accordance with a first baseband clock frequency, a first indication based on a detection of the pre-determined preamble sequence in the signal;
a second carrier sense detector to produce, in accordance with a second, slower baseband clock frequency, a second indication based on a detection of the pre-determined preamble sequence in a down-sampled version of the signal; and
a decider to select a baseband clock frequency based on information comprising the first indication and the second indication.

7. The apparatus of claim 6, wherein the first baseband clock frequency is an integer multiple of the second baseband clock frequency.

8. The apparatus of claim 6, wherein the data indicative of the pre-determined preamble sequence comprises one or more orthogonal frequency division multiplexing (OFDM) symbols.

9. The apparatus of claim 6, wherein the receiver section is configured to receive spatially steered signals via a spatial wireless channel.

10. The apparatus of claim 9, wherein the receiver section receives a spatially steered signal via two or more antennas.

11. The apparatus of claim 6, wherein the first carrier sense detector stores a first version of the pre-determined preamble sequence, wherein the second carrier sense detector stores a second, longer duration version of the pre-determined preamble sequence.

12. A system comprising:
two or more wireless communication devices that are configured to
generate a baseband signal indicative of one or more symbols,
modulate the baseband signal at a carrier frequency to produce a modulated signal,
transmit the modulated signal via a wireless channel,
provide a clock signal to control, in the baseband signal, a duration of the one or more symbols,
selectively use a first clock frequency to generate a first baseband signal having a first bandwidth, and
selectively use a second, lower clock frequency to generate a second baseband signal having a second, lower bandwidth, wherein the second clock frequency is used to extend a wireless communication range of the wireless channel,
wherein the one or more wireless communication devices are configured to (i) generate in accordance with the first clock frequency one or more first preamble symbols based on a pre-determined preamble sequence when the first clock frequency is used, and (ii) generate in accordance with the second clock frequency one or more second preamble symbols based on the pre-determined preamble sequence such that the one or more second preamble symbols have a longer duration than the one or more first preamble symbols when the second clock frequency is used.

13. The system of claim 12, wherein the first bandwidth is an integer multiple of the second bandwidth.

14. The system of claim 12, wherein at least one of the wireless communication devices is configured to generate orthogonal frequency division multiplexing (OFDM) symbols.

15. The system of claim 12, wherein at least one of the wireless communication devices is configured to (i) determine a communication mode based on a quality-of-service requirement and (ii) select a clock frequency based on the communication mode.

16. The system of claim 12, wherein at least one of the wireless communication devices is configured to transmit spatially steered signals that concurrently provide data to two or more wireless communication devices via two or more spatial wireless channels, respectively, wherein the modulated signal comprises at least one of the spatially steered signals.

* * * * *